United States Patent [19]

Tsunoda et al.

[11] Patent Number: 5,359,621
[45] Date of Patent: Oct. 25, 1994

[54] HIGH EFFICIENCY GAS LASER WITH AXIAL MAGNETIC FIELD AND TUNABLE MICROWAVE RESONANT CAVITY

[75] Inventors: Stanley I. Tsunoda, Encinitas; Tihioro Ohkawa, La Jolla, both of Calif.

[73] Assignee: General Atomics, San Diego, Calif.

[21] Appl. No.: 59,549

[22] Filed: May 11, 1993

[51] Int. Cl.$^5$ .................. H01S 3/03; H01S 3/0975
[52] U.S. Cl. ........................ 372/82; 372/55; 372/56; 372/61; 372/62
[58] Field of Search ............... 372/55, 56, 61, 62, 372/82

[56] References Cited

U.S. PATENT DOCUMENTS

| | | | |
|---|---|---|---|
| 3,602,837 | 8/1971 | Goldsborough | 331/94.5 |
| 4,698,822 | 10/1987 | Leprince et al. | 372/70 |
| 5,225,740 | 7/1993 | Ohkawa | 315/111.41 |

FOREIGN PATENT DOCUMENTS

| | | |
|---|---|---|
| 0403418 | 12/1990 | European Pat. Off. . |
| 8810506 | 12/1988 | World Int. Prop. O. . |
| 9106199 | 5/1991 | World Int. Prop. O. . |

OTHER PUBLICATIONS

"JP, A, 59-103341", *Patent Abstracts of Japan*, vol. 8, No. 217 (E–270)(1654) Jun. 14, 1984.

"High–Power Gas Lasers, 1975", *The Institute of Physics*, Conference Serurs No. 29, Edited by E. R. Pike (1975) no Month available.

Zhu et al., "Ar II Laser Generated by Landau Damping of Whistler Waves at the Lower Hybrid Frequency", *Physical Review Letters*, vol. 63, No. 26, pp. 2805–2807 (Dec. 1989).

Katsurai et al., "Microwave–Excited Ionized Laser with External Magnetic Field", *Electronics and Communications in Japan*, vol. 54–B, No. 1, pp. 61–68 (1971) no month available.

Stevens, et al., *Proceedings of 9th Topical Conference on RF Power in Plasmas*, No. 244 (Aug. 19, 1991).

Karpman, et al., "Axially Symmetric Self-Focusing of Whistler Waves", *J. Plasma Physics*, vol. 31, Part 2, pp. 209–223 (Apr. 1984).

Hong, et al., "The Effect of the Sample Iris in Detrmination of Dielectric Constants Using a Microwave Cavity", *Journal of the Korean Physical Society*, vol. 7, No. 1, pp. 36–40 (1974).

*Primary Examiner*—Rodney B. Bovernick
*Assistant Examiner*—Robert McNutt
*Attorney, Agent, or Firm*—Fitch, Even, Tabin & Flannery

[57] ABSTRACT

A gas discharge laser includes a cylindrical symmetric discharge tube, having a prescribed gas therein at a low pressure, centered within a microwave-resonant cavity immersed in an axial magnetic field. Appropriate mirrors, optically aligned with a longitudinal axis of the discharge tube, are positioned at each end of the plasma column, one of which is partially transmissive. A pair of Brewster windows, or a pair of flat windows with anti-reflective coatings, one at each end of the discharge tube, are interposed between the mirror and discharge tube. Electromagnetic energy in the microwave range, e.g., greater than 1 GHz, is injected into the cavity and made to resonate in an appropriate mode. A large portion of the resonating energy is coupled into the discharge tube, causing a plasma to be created and maintained. The axial magnetic field confines the plasma to the center regions of the discharge tube, away from the walls, so as to form a plasma column. Sufficient energy to maintain a population inversion is imparted to the plasma column by the resonant electromagnetic energy. To the electromagnetic energy that propagates in the cavity, the configuration resembles a coaxial transmission line, with the plasma column functioning as the center conductor. The dominant loss of such coaxial cavity is to the plasma, thereby efficiently applying microwave power to the plasma.

22 Claims, 3 Drawing Sheets

HIGH EFFICIENCY GAS LASER WITH AXIAL MAGNETIC FIELD AND TUNABLE MICROWAVE RESONANT CAVITY

BACKGROUND OF THE INVENTION

The present invention relates to lasers, and more particularly to a gas discharge laser that utilizes a new type of discharge that offers an improved efficiency over that which has heretofore been achieved.

A laser is a device that generates coherent, nearly single-wavelength (and frequency), highly directional electromagnetic radiation emitted somewhere in the range from the submillimeter through ultraviolet and x-ray wavelengths. The word laser is an acronym for "Light Amplification by Stimulated Emission of Radiation."

Quantum theory shows that matter can exist in only certain allowed energy levels or states. In thermal equilibrium, lower energy states of matter are preferentially populated, since occupation probability is proportional to $e^{E/kT}$, where E is the state energy, T is the temperature, and k is the Boltzmann constant. An excited state will normally decay spontaneously to a lower energy state, emitting a quantum or wave packet of electromagnetic radiation (photon) with transition frequency $v = \Delta E/h$, where $\Delta E$ is the energy difference between the two states and h is Planck's constant. The presence of radiation at frequency $v$ can cause a transition from the lower energy state to the upper energy state with the absorption of a photon and a corresponding decrease in the electromagnetic field energy. A transition from the upper state to the lower state can also be induced by the radiation at the same time a photon wave packet is emitted coherently with (i.e., having the same frequency as) the stimulating radiation wave. Such stimulated emission process is the reverse of the absorption process. If the matter can be forced out of thermal equilibrium to a sufficient degree, so that the upper state has a higher population than the lower state (a condition known as "population inversion"), then more stimulated emission than absorption occurs, leading to the coherent growth (amplification or gain) of the electromagnetic wave at the transition frequency.

A laser generally requires three components for its operation: (1) an active medium with energy levels that can be selectively populated; (2) a pumping process to produce population inversion between some of these energy levels; and (3) a resonant electromagnetic cavity structure containing the active medium, which serves to store the emitted radiation and provide feedback to maintain the coherence of the electromagnetic field. In a continuously operating laser, coherent radiation will build up in the cavity to a level required to balance the stimulated emission process with the cavity and medium losses. The system is then said to be "lasing", and radiation is emitted in a direction defined by the cavity.

One type or class of lasers uses a gas as the active or lasing medium. External energy is applied to the gas in order to initiate a discharge that causes inversion to occur between some of the constituents of the gas. Gas lasers advantageously provide high output power, needed for many laser applications. Disadvantageously, gas lasers, and in particular ion lasers, are notoriously inefficient. For example, in order to produce an output power of 10–30 W using an ion laser, such as an Argon ion laser, an input power of 20–60 KW is required. Thus, while a desired high power laser output can be achieved using a gas laser, such high power output comes at great expense (very high input power). Thus, what is needed is a gas laser that provides high output power at increased efficiency.

For example, in an $Ar^+$ laser, the population inversion occurs, as is the case for most ion lasers, through excitation of Ar ions from a ground state (nonexcited state) to a first excited state (or upper level). From the upper level there is a slow radiative decay to the ground state and to a second excited state (lower level). From the lower level there is a very rapid radiative decay back to the ground state. Excitation to the upper level from the ground state occurs through electron impact. There are no significant collisional effects on the decay rates. Rather, all decay is purely radiative. Hence, the pressure of the neutral gas in an ion laser may be much lower than is the case with non-ion gas lasers, where a higher pressure is needed to maintain a needed collisional rate. The population inversion in the argon ion laser occurs due to the slow decay of the upper lasing level, and the rapid decay from the lower level to the ground level.

As indicated, excitation to the upper level occurs due to electron impact on the argon ion. Hence, the excitation rate and therefore the spontaneous emission of the visible output depend primarily on the electron density, which equals the ion density. For typical electron temperatures, the density at which the maximum lasing action occurs is between $10^{14}$ cm$^{-3}$ and $10^{15}$ cm$^{-3}$. Once this density is achieved, the gain for the visible output is saturated, and the visible output power density cannot be increased. Hence, in an argon ion laser, or other ion laser where a similar inversion mechanism is employed, the key problem addressed is how to maintain an ion density of between $10^{14}$ cm$^{-3}$ and $10^{15}$ cm$^{-3}$ using as little input power as possible. Disadvantageously, prior art argon ion lasers have required a great deal of input power to maintain such ion density, and hence such lasers are very inefficient.

Thus, where the lasing species comprises a fully or partially ionized gas, i.e., a plasma, the available output power is highly dependent upon the plasma density. The plasma is confined within a narrow discharge tube, with the plasma being confined near the center of the discharge tube away from the walls of the discharge tube. The ions in the plasma are quickly spent (recombined to form neutral particles, or otherwise changed to a state not useful as a lasing species) whenever they come in contact with the walls of the discharge tube. Such loss of the ions or plasma into the walls of the discharge tube is referred to as "radial plasma loss". The input power to the laser depends on the radial plasma loss rate. That is, the faster the plasma is lost, the more input power is required to maintain a given density. Thus, for more efficient operation, where efficiency is defined as the output power divided by the input power, it is essential that the radial plasma loss be kept small.

Where a plasma is used as the lasing species, a certain amount of energy must be expended in order to create, and then maintain, the plasma. This is commonly done by applying a large dc voltage across spaced-apart electrodes placed within the discharge tube, which high voltage causes the gas to break down so as to create the desired ion constituents, thereby forming the plasma. Once the plasma is formed, a large dc current is allowed to flow through the plasma, which dc current sustains the lasing action (i.e., provides the energy to maintain the plasma and the needed population inversion, which inversion occurs when the density is high enough, as explained above). Disadvantageously, the large dc current also creates hydrodynamic instabilities that cause the bulk,of the plasma to blow apart and be spent in the walls of the discharge tube. As a result, the walls heat up, and must be cooled, e.g., using an externally applied coolant, to avoid thermal meltdown. All this action necessitates that additional power be put into the laser in order to create new plasma (to replace that which has been blown apart) and in order to cool the walls of the discharge tube. Such increased input power further decreases the efficiency of the laser. Hence, what is needed is an ion or plasma laser wherein the need for such additional input energy is minimized or eliminated, thereby improving the overall laser efficiency.

Additionally, it is noted that where the discharge tube is cooled, the material from which the discharge tube is made (typically quartz) experiences severe thermal cycling, thereby shortening its life, and hence shortening the life of the laser. It would be desirable if the severe thermal cycling to which the discharge tube is subjected could be reduced, thereby lowering the cooling requirements of the discharge tube, and increasing its operating life.

Further, the use of electrodes within the discharge tube of a gas laser limits the types of gases that may be placed therewithin. That is, some gases may be highly reactive, and quickly react with any conductive electrodes that may be within the discharge tube area, thereby decreasing the operating life of the laser. Hence, an electrodeless laser would be desirable, thereby effectively increasing the life of the laser and permitting more reactive gases to be used therewithin.

Another element that contributes to the inefficiencies of a gas or ion laser is the presence of neutral particles that tend to drift (be carried) with the dc current towards one end of the plasma column within the discharge tube, thereby creating a pressure differential between the ends of the plasma column which interferes with the lasing operation. Elaborate "gas return systems" are thus used in the art that remove the neutral particles from one end of the plasma column and reintroduce them at the other. Their presence further adds to the expense and complexity of the laser. What is thus needed is a gas laser wherein such gas return systems are not needed.

SUMMARY OF THE INVENTION

The present invention addresses the above and other needs by providing a particular gas discharge laser configuration that uses resonant microwave energy to create and maintain a high density plasma within a narrow discharge tube, uses microwave currents and fields associated with the resonant microwave energy to establish and maintain the plasma and the requisite population inversion within the plasma column (so as to sustain the lasing operation), and uses an axial magnetic field to confine the plasma within the center of the discharge tube away from its walls. Such a configuration is not prone to the hydrodynamic instabilities present in dc discharge lasers. Advantageously, the laser configuration of the invention allows a lower pressure to exist within the discharge tube. Such lower pressure means that a lower ion-neutral collision frequency exists. A lower collisional frequency, in turn, means that fewer ions are forced out into the wall of the discharge tube, or said another way, that there is a lower radial transport or radial diffusion due to collisions. Hence, fewer ions are spent in the discharge tube wall, and a higher efficiency results. Further, the invention eliminates the need for electrodes, avoids the use of dc currents (and the attendant pressure differential problems and gas return systems needed when such dc currents are present), and keeps the walls of the discharge tube relatively cool. Thus, the laser of the present invention may operate at a higher efficiency than has heretofore been possible with prior art gas discharge lasers, as well as operate using more reactive gases.

A gas discharge laser made in accordance with the present invention includes a cylindrical symmetric discharge tube having a prescribed gas or gases therein at low pressure. The discharge tube is centered within a high Q microwave-resonant cavity immersed in an axial magnetic field. Appropriate mirrors, optically aligned with a longitudinal axis of the discharge tube, are positioned at each end of the plasma column, one of which is partially transmissive. A pair of Brewster windows, or a pair of flat windows with antireflective coatings, one at each end of the discharge tube, are interposed between the mirror and discharge tube. Electromagnetic energy is injected into the cavity and made to resonate in an appropriate mode. A large portion of such energy is coupled into the discharge tube, causing a plasma to be created and maintained. The axial magnetic field, coupled with the low pressure, minimizes radial plasma loss by confining the plasma to the center regions of the discharge tube, away from the walls, so as to form a plasma column. Sufficient energy to sustain the needed population inversion for the desired lasing action is imparted to the plasma column by the resonant electromagnetic energy.

To the electromagnetic energy that propagates in the cavity, the configuration resembles a coaxial transmission line, with the plasma column functioning as the center conductor, and with oscillating radial electric fields and azimuthal magnetic fields being present in the region between the center conductor and the conductive walls of cavity. Advantageously, unlike dc gas discharge lasers, no electrodes are used within the plasma column, and no dc current flow is present in the plasma column. Hence, no hydrodynamic instabilities occur, the radial diffusion to the tube walls is slowed, and liquid cooling of the tube walls may not be needed. Further, because there is no dc current, there is no pressure differential between the ends of the plasma column, and hence there is no need for any type of gas return system.

One embodiment of the present invention may thus be characterized as a gas discharge laser. Such gas discharge laser includes: (1) a cylindrical symmetric high Q cavity having a longitudinal axis; (2) means for establishing resonant microwave energy within the cavity; (3) a discharge tube inside of and coaxial with the longitudinal axis having a prescribed gas therein; (4) means for establishing an axial magnetic field having a prescribed intensity within the discharge tube, the axial magnetic field being characterized by magnetic field lines that are substantially parallel to the longitudinal axis along the length of the discharge tube; and (5) first and second mirrors located adjacent first and second ends of the discharge tube, respectively, the first and second mirrors being optically aligned with the longitudinal axis so that light reflects between the mirrors through the discharge tube, with the first mirror being totally reflective, and with the second mirror being partially transmissive. In operation, the resonant microwave energy is coupled into the discharge tube and ionizes the prescribed gas to produce a plasma column having a population inversion, causing light emissions to occur that reflect between the first and second mirrors. The reflected light is amplified as it passes through the plasma column by additional light emissions, thereby producing the laser.

Another embodiment of the invention may be characterized as a method of producing a plasma laser discharge. Such method includes, as an initial step, positioning a narrow discharge tube inside of a larger diameter conducting cylinder, thereby forming a high Q, cylindrical-symmetric, resonant cavity. A longitudinal axis of the discharge tube is positioned to be coaxial with a longitudinal axis of the resonant cavity. The discharge tube is then filled with a prescribed gas at a prescribed pressure. Then, resonant electromagnetic energy of a prescribed mode at microwave frequencies is established and maintained in the resonant cavity. The resonant microwave energy couples into the discharge tube where it ionizes the gas to form a plasma. When the plasma density reaches a sufficiently high level, a substantial population inversion is created. As a further step of the method, an axial magnetic field is externally applied having magnetic field lines that are substantially parallel with the longitudinal axis of the discharge tube. Such axial magnetic field operates to confine the plasma within the center of the discharge tube away from the walls of the discharge tube, thereby creating a plasma column within the discharge tube. An additional step of the method involves placing mirrors at each end of the discharge tube so as to be optically aligned with each other. These mirrors serve to reflect and resonate light (photons) that is emitted as high energy states of matter within the plasma decay to low energy states. This light, as it reflects through the plasma, serves to excite additional matter in the plasma to the high energy states, thus causing additional light to be emitted, thereby amplifying the light as it passes through the plasma, and thereby producing the plasma laser discharge.

It is thus a feature of the invention to provide a gas discharge laser that provides high output power at increased efficiency. More particularly, it is a feature of the invention to provide a highly efficient gas/ion discharge laser that uses resonant microwave energy to create a high density plasma to be used as the lasing medium, maintains the radial plasma loss at a minimum level, and eliminates the use of electrodes and a dc current.

It is a further feature of the invention to provide an ion laser wherein only a very low pressure is needed within the plasma discharge tube, thereby slowing radial diffusion of the ions to the discharge tube wall.

It is another feature of the invention, in some embodiments, to provide a gas/ion discharge laser wherein the discharge tube reduces the external cooling requirements, thereby further improving the efficiency of the laser and increasing its operating life.

It is yet an additional feature of the invention to provide a gas/ion laser having a long operating life.

It is still another feature of the invention to provide such a gas/ion laser wherein more reactive gases may be used in the discharge tube than have heretofore been useable.

It is still another feature of the invention to provide a gas discharge laser that does not require the use of gas return systems to redistribute the neutral gas particles within the discharge tube.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

Figure 1:
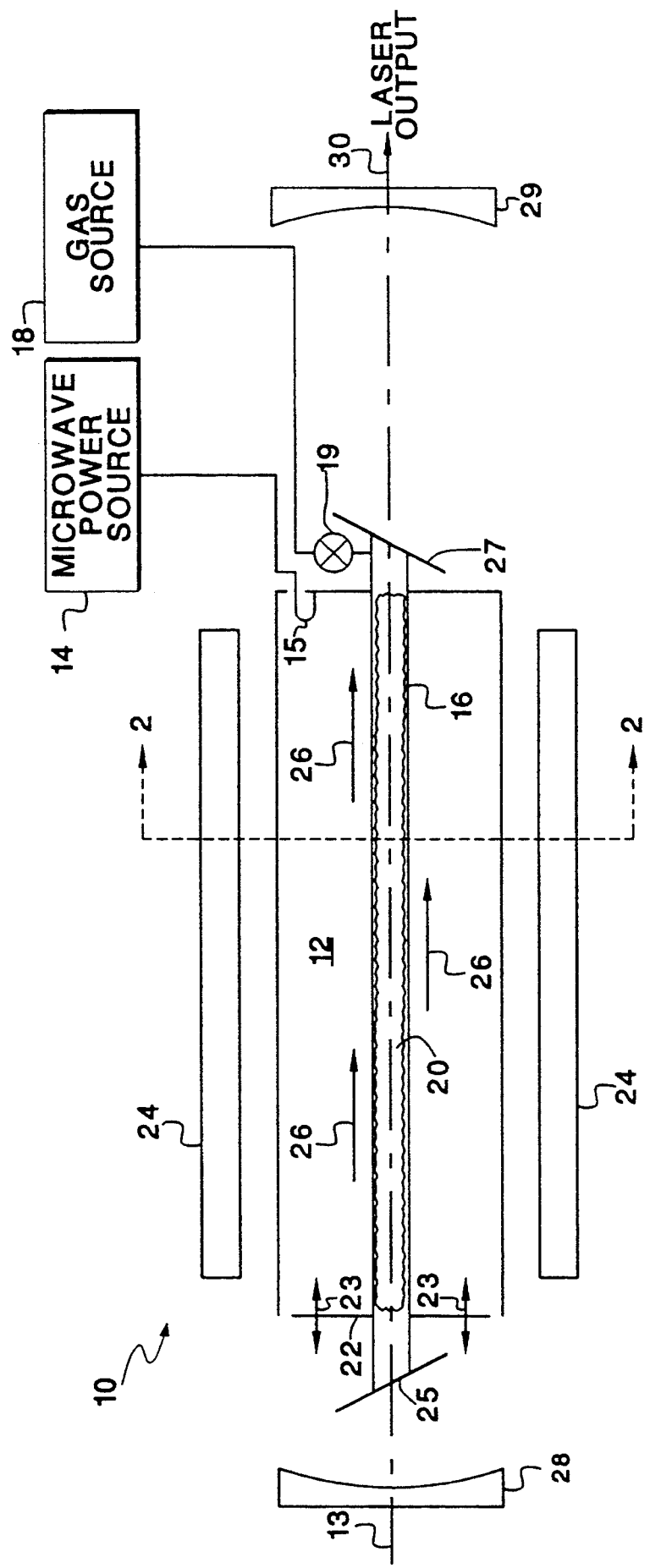
FIG. 1 is schematic diagram of a gas discharge laser made in accordance with the present invention.

The following description is of the best mode presently contemplated for carrying out the invention. This description is not to be taken in a limiting sense, but is made merely for the purpose of describing the general principles of the invention. The scope of the invention should be determined with reference to the claims.

The ability of achieving a high density plasma in a narrow discharge tube using microwave whistler mode excitation is described in applicant Ohkawa's co-pending U.S. patent application Ser. No. 07/857,981, filed Mar. 26, 1992, entitled *Method and Apparatus For Producing High Density Plasma Using Whistler Mode Excitation*. A continuation-in-part application to the '981 application, bearing the same title, and adding applicant Tsunoda as a joint inventor, was filed with the United States Patent Office on Jan. 28, 1993 as patent application Ser. No. 08/010,553. Both the '981 and '553 applications are incorporated herein by reference.

As taught in the cited '981 and '553 patent applications, a particular launching configuration, comprising a microwave cavity, is placed adjacent a plasma chamber so that the microwave energy, in the form of a whistler wave, can be launched from the resonant cavity into the plasma chamber. Axial launching of the whistler wave is the preferred configuration disclosed in the cited applications, but radial launching is also mentioned. In particular, a laser configuration is disclosed in the cited applications (FIG. 6 thereof) wherein radial excitation is used. The radial excitation is achieved by placing a cylindrical plasma chamber between two reflective surfaces (mirrors), at least one of which is partially transmissive. The plasma chamber is centered within a cavity that includes an outer wall and inner rings, which outer wall and inner rings function as a microwave cavity with periodically slotted gaps. The spacing of the gaps is determined as a function of the wavelength of the excited mode. The excited mode couples or launches microwave power into the plasma chamber, which power promotes the formation of high density plasma within the chamber. The high density plasma, in turn, allows the laser operation to take place.

The present invention, while bearing some similarities to the laser apparatus shown in the cited applications, differs therefrom in several significant aspects. Whereas the microwave energy in the cited applications is launched into the plasma chamber from an adjacent or surrounding microwave resonant cavity, the present invention uses a resonant configuration that makes a plasma column, formed in the plasma discharge tube (or plasma chamber), an integral part of the microwave resonant cavity. That is, a plasma column is conductive. Hence, in accordance with the present invention, the conductive plasma column is used as the center conductor of a coaxial transmission line resonant cavity configuration. Thus, as resonant microwave energy resonates within the resonant cavity, it automatically causes microwave currents to flow through the plasma, which currents help to sustain the desired lasing action.

Figure 3:
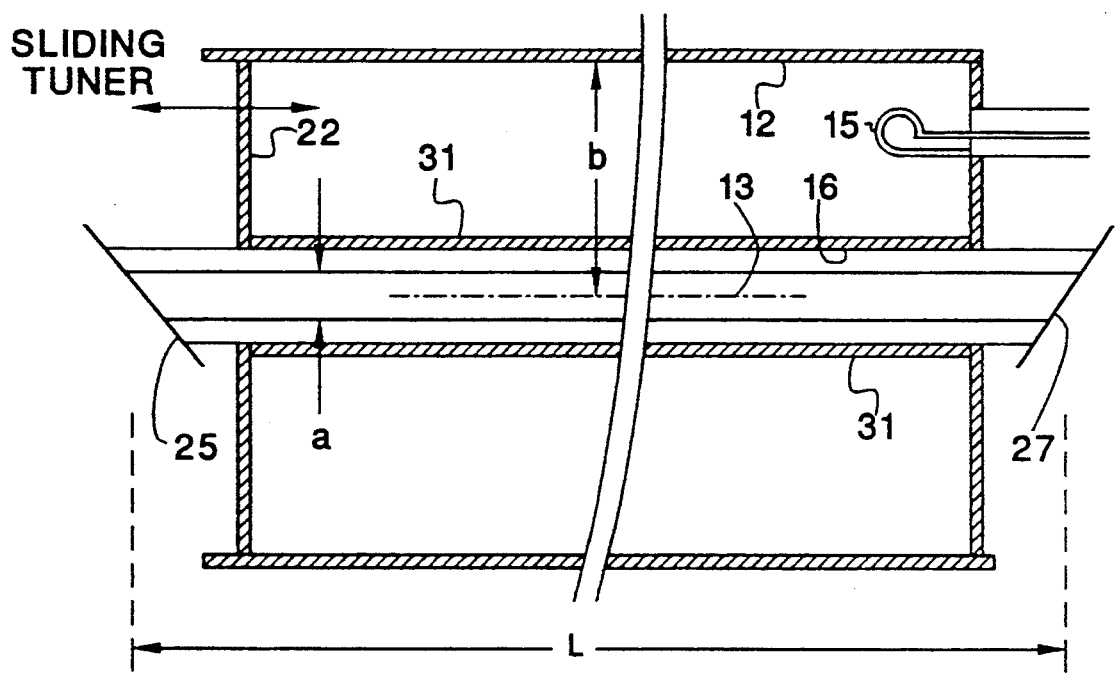
FIG. 3 is a schematic diagram of one specific geometry that could be used for a microwave cavity and discharge tube of a gas laser made in accordance with the present invention.

Additional differences between the present invention and the laser apparatus shown in the cited applications include the elimination of the slotted gaps that are used in the prior laser apparatus. Moreover, the present invention uses a sliding tuner, as shown in FIGS. 1 and 3, whereas the prior apparatus has no such tuning capability. Additionally, the present invention uses a vacuum resonance condition outside of the plasma, whereas the '981 laser apparatus uses a plasma resonance inside of the plasma. A plasma resonance is sensitive to density and other conditions of the discharge. A vacuum resonance is insensitive to changes in the density or other conditions in the discharge.

Figure 2:
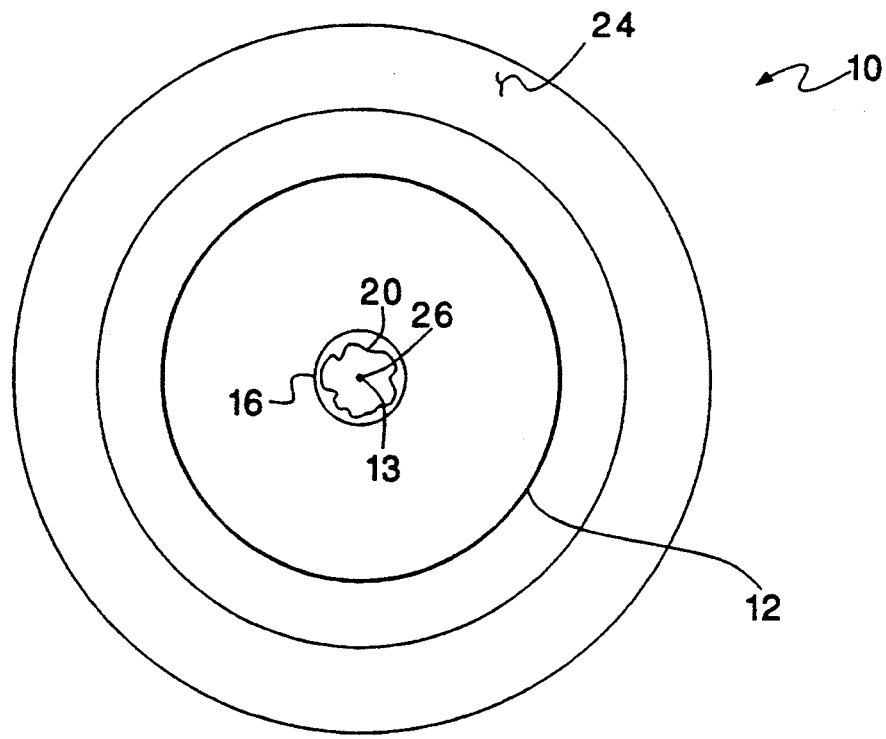
FIG. 2 is a schematic sectional view of the gas discharge laser of FIG. 1 taken along the line 2—2.

Referring to FIGS. 1 and 2, a schematic representation of a gas discharge laser 10 made in accordance with the present invention is depicted. FIG. 1 shows, in effect, a side view, and FIG. 2 shows an end (sectional) view of the resonant cavity portion of the laser. The laser 10 comprises a cylindrical, symmetric microwave resonant cavity 12 having a longitudinal axis 13. The walls of the cavity 12 are conductive, and one end of the cavity 12 includes a tunable plunger 22. The tunable plunger 22 may be adjusted, as required, as indicated by the arrows 23, in order to tune the cavity 12 to a desired resonant frequency. The resonant cavity 12 has a high Q associated therewith, where Q is defined as $2\pi$ times the resonant frequency times the stored energy divided by the power loss. There are two measures of Q, one "loaded" and the other "unloaded", where loaded and unloaded refers to whether a plasma column 20 is present (loaded) or not present (unloaded) within the cavity. The unloaded Q is typically measured by placing a metal rod in the center of the cavity 12 in place of the discharge tube. For best operation, the cavity 12 should have an unloaded Q of at least 1000. Such a high unloaded Q assures that the dominant power loss in the cavity when loaded will be to the plasma. Thus, the loaded Q will be much less than the unloaded Q because most of the resonating energy in the cavity is expended as power in the plasma column in order to support the lasing action.

Still referring to FIGS. 1 and 2, a microwave power source 14 couples microwave power into the cavity 15 through the use of a suitable antenna or launching probe 15. Typically, the launching probe 15 is positioned at the end of the cavity 12 opposite the tunable plunger 22, but such is not required. The microwave power can be injected into the cavity 12 at any location, and using any suitable injection probe or equivalent device(s), that allows the microwave power to resonant in the cavity 12 in accordance with a desired mode.

A cylindrical, symmetric discharge tube 16 made, e.g., from ceramic or quartz, is centered within the cavity 12 so as to be aligned with the longitudinal axis 13. The tube 16 is filled with a desired gas or gases, obtained from a gas source 18. A desired pressure is established within the gas-filled discharge tube 16 in conventional manner, e.g., using valves 19, vacuum pumps, etc. Advantageously, the pressure may be very low compared to that required in prior art gas/ion lasers. A representative pressure for use by the present invention is on the order of 5–50 mTorr. In contrast, prior art dc lasers require a pressure of from 100 mTorr to 1 Torr. Low pressures increase the efficiency of the laser because the low pressure decreases the ion-neutral collisions, which collisions contribute to the radial plasma loss to the walls of the discharge tube.

A magnet 24 is placed around the cavity 12. Typically, the magnet is a solenoid-type magnet that produces an axial magnetic field, i.e., a magnetic field having field lines that are parallel to the longitudinal axis 13, in the center space of the magnet. Such magnetic field is represented in FIG. 1 by the lines 26, with the arrow head indicating the polarity of the magnetic poling. The polarity of the magnetic field is unimportant. The manner of making solenoid-type magnets so as to produce an axial magnetic field is known in the art.

While the arrows 26 shown in FIG. 1, representing the magnetic field, are shown as being offset from the longitudinal axis 13, such offset is used only for clarity. In operation, the magnetic field is present throughout the center volume of the magnet 24, but is strongest near the center, i.e., the magnetic field is strongest coincident with the longitudinal axis 13. Within the volume of the plasma, though, the magnetic field is essentially uniform. Thus, as depicted by the field lines 26, the magnetic field is oriented so that the magnetic field lines are substantially parallel to the longitudinal axis 13, with the strongest magnetic field existing coincident with the longitudinal axis 13.

It is thus seen that the laser 10 includes the cylindrical symmetric discharge tube 16, having a prescribed gas or gases therein, centered within the high Q microwave-resonant cavity 12, which cavity 12 is immersed in an axial magnetic field 26. A first mirror 28, that is 100% reflective, is aligned with axis 13 at one end of the discharge tube 16. A second mirror 29, which is partially transmissive, is also aligned with the axis 13 and is positioned at the other end of the discharge tube 16. A Brewster window 25 is interposed between the mirror 28 and the closest end of the discharge tube 16, and another Brewster window 27 is interposed between the mirror 29 and the closest end of the discharge tube 16. Alternatively, in lieu of the Brewster windows 27 and 25, a pair of flat windows with antireflective coatings may be used. The function of the Brewster windows 25 and 27, or windows having antireflective coatings, is to permit light of a particular polarization to pass with minimal reflection therethrough, thereby maximizing the gain of the laser output, as is commonly done in the laser art.

In operation, electromagnetic power from the power source 14, in the microwave range, e.g., greater than 1 GHz, is applied to the resonant cavity 12 through the probe 15. Typically, the power source 14 comprises a magnetron. The cavity 12 is tuned, using the adjustable plunger 22, or equivalent, so as to set up a high Q resonant condition within the cavity 12. Thus, as a result of such resonant condition, microwave energy resonates in the cavity 12 in a desired mode. A large portion of such resonating energy is coupled into the discharge tube 16, ionizing the gas therein, thereby creating a high density plasma.

Advantageously, the axial magnetic field 26 confines the plasma formed in the discharge tube 16 to a plasma column 20 that exists in the center regions of the discharge tube, away from the walls of the discharge tube. By this action, the axial magnetic field thus significantly minimizes the radial plasma loss that occurs within the discharge tube. Sufficient energy is imparted to the plasma column 20 so as to maintain the needed plasma density, thereby sustaining the needed population inversion for the desired lasing action to occur. The population inversion causes light emissions to occur as high energy states of matter within the plasma decay to low energy states. This light (photons) reflects between the mirrors 28 and 29, passing through the plasma column 20 and Brewster windows 25 and 27 each time it is so reflected. As the light passes through the plasma column, it serves to excite additional matter in the plasma to the high energy states, thus creating additional light emissions as such high energy states decay to low energy states. The additional light emissions thus amplify the light as it passes through the plasma, thereby producing the desired coherent plasma laser discharge. A portion of the resonating and amplified light is output through the partially transmissive mirror 29 as a laser output beam 30.

The improved efficiency of the laser 10 results from achieving and maintaining a high density plasma within the plasma column 20 using relatively little input power. It is not necessarily the attainment of a higher density plasma, however, that results in the increased efficiency. In most instances, plasma densities higher than those that are used in conventional dc laser discharge devices are not required (although a higher density can increase the ultra-violet output of some ion lasers). Rather, the increased efficiency results because the radial plasma loss rate is kept small. The radial plasma loss rate is kept small, in turn, because the hydrodynamic instabilities that commonly occur in plasma lasers of the prior art, due to the presence of dc currents, do not occur. Further, the low natural pressure associated with the microwave discharge minimizes classical diffusion (which is based on ion-neutral collisions), and the axial magnetic field 26 retards the radial diffusion of the plasma 20 to the inner surfaces of the discharge tube, thus allowing the magnetic field to effectively slow the radial plasma loss to the wall. Advantageously, when the radial plasma loss rate is kept low, less input power is required to create and replace the plasma that would otherwise be spent as the plasma strikes the walls of the discharge tube (as occurs when high pressure produces more ion-neutral collisions, or when hydrodynamic instabilities are present). Further, keeping the plasma away from the surfaces of the discharge tube means that the discharge tube can operate at much lower temperatures, and external cooling may not be required, which further reduces the input power required to operate the laser.

The application of the present invention is restricted to certain types of lasers. For example, gas lasers in which the lasing species are neutral often require high neutral pressure since high optical gain normally implies a high density of the excited species. Thus, e.g., in a $CO_2$ laser the typical pressure is about 100 torr. At such a high pressure, the electron-natural collision rate is much greater than the electron cyclotron frequency $\omega_{ce} = eB/m$ associated with a reasonable magnetic field of, say, 0.5 tesla. Here B is the magnetic field strength and e and m are the charge and mass of the electron, respectively. Hence, the magnetic field has no significant confining effect.

In contrast to neutral gas lasers, ion lasers do not generally require the high pressures associated with neutral gas lasers. Thus, such gas ion lasers are particularly well suited for the present invention. Two types or classes of ion lasers are of interest. One class comprises metal vapor lasers which combine metal ions and noble gases. An example of a metal ion laser is the HeCd laser. The other class comprises the noble gas ion lasers, such as gas ion lasers that use argon (Ar), neon (Ne), helium (He), xenon (Xe), krypton (Kr), or radon (Rn) as the prescribed gas in the discharge tube. The description presented herein is applicable to a large subset of such gas ion lasers. For simplicity, however, the following detailed description focuses on the most common laser of the second class, i.e., the argon ion laser. However, it is to be understood, that any type of gas ion laser could be made utilizing the teachings presented herein.

To better appreciate an argon ion laser made in accordance with the present invention, it will first be helpful to review conventional argon ion laser technology. Argon ion lasers have been known in the art since as early as 1964. All known present day argon ion laser employ dc discharges. The current densities associated with a CW argon ion laser are typically in the range of 100 to 2000 A/cm$^2$. The diameters of the plasma columns are on the order to 1 to 10 mm, with neutral pressures of 0.1 to 1.0 torr. An axial magnetic field of order 1000 G is also utilized. The typical ionization fraction is about 1%, and the electron temperature is between 2 and 4 eV. Typical lengths range from 20 to 200 cm. Such dc discharge ion lasers operate in the blue and the green with high intensity lines at 488.0 nm and 514.5 nm. Lasing can also occur in the UV spectrum. Disadvantageously, the typical electrical efficiency is only about 0.05%. For example, the Spectra-Physics Model 2030 laser has a multiline output of 20 W (which is the sum of all the power in the output spectral lines between 457.9 and 514.5 nm). The power requirement is 38 KW. The cooling requirement is 3.5 gal/min of water flow at 50 psig. The power supply occupies 7.2 cubic feet and weighs 150 lb.

The discharge tube of existing argon ion lasers is a complicated structure due to its thermal engineering. It consists of an outer, water-jacketed ceramic tube that envelops a series of tungsten washer "limiters" which define the radial edge of the discharge. Such washers are supported inside the ceramic tube by coaxial copper washers that radially transport the heat to the water jacket. The tungsten is brazed on to the copper. The structures float electrically. In addition, the structure includes a gas return path external to the discharge so that argon neutrals, which are pumped from one end of the tube to the other by the dc current, can return. In the absence of such a recirculation system, the discharge would extinguish itself.

A solenoid magnet surrounds the discharge tube and produces an axial magnetic field of typically 0.16 tesla. The purpose of the field, however, is not primarily to provide radial confinement, Rather, its primary purpose appears to be to improve the spontaneous emission.

In contrast to such a dc discharge argon ion laser, with its complex and expensive discharge tube configuration, and with its inefficient operation, the basic structure of the discharge tube of the present invention may be as shown in FIG. 3. The significance of the structure of FIG. 3 (which is essentially the same as the resonant cavity and discharge tube portions of FIG. 1) is its simplicity. The discharge tube 16 comprises a simple quartz or ceramic tube having a prescribed inner diameter (id), which may range from, e.g., 0.1 to 2.0 cm. Notably absent from the discharge tube is a cooling water jacket (although, one could be easily added, if needed), or any type of washer limiters that provide a particular thermal structure.

The length of the discharge tube, L, measured between the Brewster windows 25 and 27, is on the order of 10 to 200 cm. The Brewster windows, or equivalent optical devices, provide the desired optical interface between the inside and outside of the discharge tube so that the optical transmission through such interface is optimized (minimum loss). The term "window" refers generally to the Brewster window, antireflective coating or equivalent optical interface. Brewster windows, or equivalent devices (e.g., flat windows with antireflective coatings), are known in the art, and may be obtained commercially, for example, from Newport Corporation of Fountain Valley, Calif. In the presence of a high magnetic field, it is noted that the emission through the discharge tube is split by the Zeeman effect. That is, the emission along the field lines is circularly or elliptically polarized. Hence, flat windows with antireflective coating may be more effective than Brewster windows when high magnetic fields are used.

Surrounding the discharge tube 16 is a resonant electromagnetic cavity 12. The discharge tube is centered within the cavity 12 so that the longitudinal axis 13 of the cavity 12 is coincident with the longitudinal axis of the discharge tube 16. The walls of the cavity 12 are conductive, made e.g., from copper and have a thickness of 1–5 mm. A conventional excitation loop or probe 15 is mounted to one end or side of the cavity 12 in order to allow the microwave power to be injected therein. The impedance may be matched between the cavity and the incoming transmission line by changing the size and/or orientation of the loop, in conventional manner. One end of the cavity 12 functions as a sliding tuner 22, allowing the length of the cavity to be selectively adjusted.

It should thus be noted that there are at least two resonant cavities associated with the laser 10. One is an optical cavity that includes the mirrors 28 and 29, well as the Brewster windows 25 and 27 (or equivalent devices). The other resonant cavity is the electromagnetic resonant cavity 12. For some embodiments of the invention, as shown below in FIG. 4, a plurality of electromagnetic resonant cavities may be employed, end-to-end, along the length of the optical cavity.

The radius, b, of the electromagnetic cavity 12 is determined by the size of the input connector and the desire to minimize the bore of the solenoid (magnet 24) that must be placed around the assembly to provide the axial magnetic field. Typically, the radius b will be on the order of 1 to 10 cm.

Figure 4:
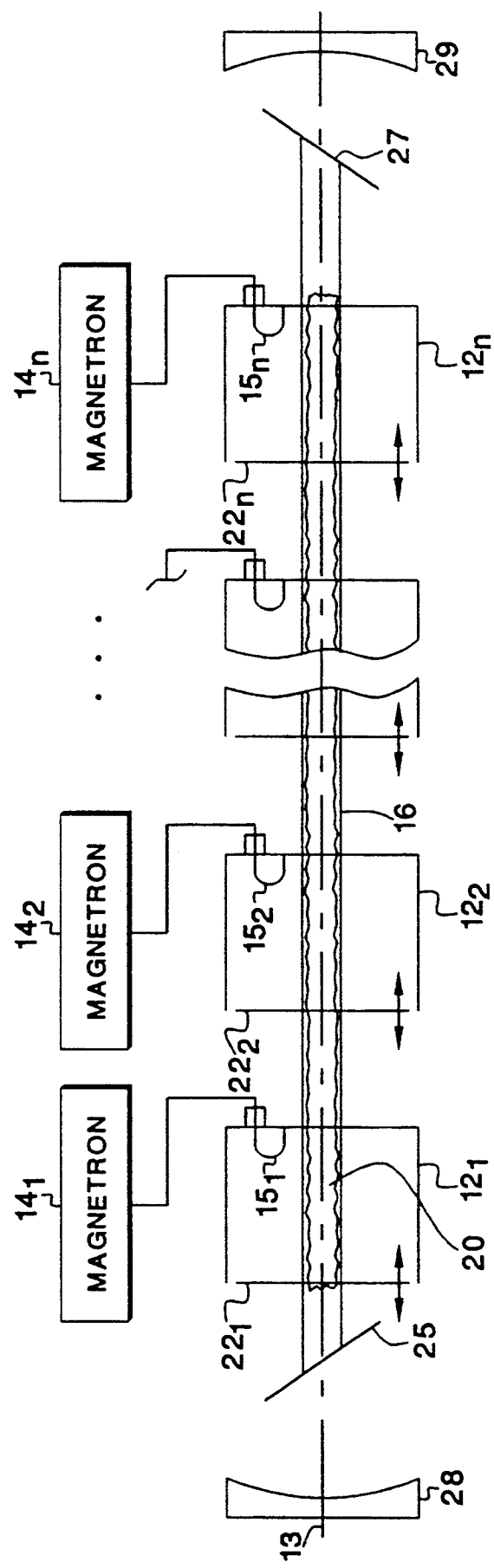
FIG. 4 is a partial schematic diagram of an alternative embodiment of a gas discharge laser made in accordance with the present invention that utilizes a plurality of electromagnetic resonant cavities within a single optical resonant cavity.

The length of the electromagnetic cavity 12 (which is somewhat less than the length L of the discharge tube) is a function of the resonant frequency that is to be established, and may be adjusted, as required, using the sliding tuner 22. A single long cavity, as shown in FIG. 3, may be used. Alternatively, a string of closely spaced shorter cavities $12_1, 12_2, \ldots 12_n$, (where n is the number of such shorter cavities that are used), each powered by separate magnetrons (microwave power source(s) $14_1, 14_2, \ldots 14_n$ may be used, as shown in FIG. 4. The minimum length of a cavity at 2.45 GHz is about one half wavelength, or about 6.12 cm. The resonance condition requires that the length of the cavity be an integral multiple of this minimum length. Each cavity $12_1, 12_2, \ldots 12_n$, includes a sliding tuning element $22_1, 22_2, \ldots 22_n$ for allowing the respective cavity to be tuned; and an input antenna loop $15_1, 15_2, \ldots 15_n$ for allowing power from its respective magnetron to be input thereinto. Not shown in FIG. 4, but assumed to be present, is one or more solenoid magnets for establishing an axial magnetic field within each of the cavities $12_1, 12_2, \ldots 12_n$. A single long solenoid magnet may be used to provide such an axial magnetic field within each of the cavities; or separate solenoid magnets may be used with each cavity.

As is evident from the figures, when a plasma column 20 is formed within the discharge tube 16, a conductive path is provided through the discharge tube. Thus, when electromagnetic energy (microwave energy) is resonating in the resonant cavity 16, the structure resembles a coaxial transmission line, with the plasma column 20 (FIG. 1) functioning as the center conductor, and with the oscillating radial electric fields and azimuthal magnetic fields (associated with the propagating microwave energy in the cavity) being present in the region between the center conductor and the conductive walls of the cavity. Advantageously, no electrodes are needed, and no dc current flows in the plasma column.

The plasma is created and sustained by the whistler wave created in the discharge tube by the surrounding resonant cavity. This wave is characterized by the condition $\omega < \omega_{ce}$, where $\omega$ is the angular frequency of the microwave excitation. The basic physics associated with whistler waves is presented in the '981 application and in the references cited therein.

It is noted that FIG. 3 shows a geometry that is similar to the geometry shown in FIG. 8 of the previously referenced '553 U.S. patent application. However, one difference is that the outer conductor of FIG. 3 is greatly reduced from that which was used in FIG. 8 of the '553 application. Also, no slotted gaps are needed for the configuration shown in FIG. 3, which means that more than one density may be used (slotted gaps work only at one density). Further, the configuration shown in FIG. 3 provides for tuning of the resonant frequency.

As required to initiate a plasma discharge in the discharge tube 16, a partially transparent conducting screen 31 may be wrapped around the outside surface of the discharge tube 16, inside of the cavity. Such conducting screen will thus serve to provide a coaxial structure prior to plasma initialization, thereby aiding the initial plasma formation process. Once the plasma is formed, the plasma column still represents the dominant loss in the cavity and power is drawn to it through the screen.

Using a plasma discharge at, e.g., 2.45 GHz, as described in the cited patent applications, it is possible to attain the high plasma densities required for a high gain argon ion laser using less input power than is currently required for dc discharge argon ion lasers having equivalent output power.

To quantitatively illustrate why the laser of the present invention is more efficient, it is noted that the dominant losses in a typical high power argon ion laser are radiation loss and radial ion pair loss to the discharge tube wall. In the radial direction, the ion mean free path is of order or greater than the tube radius (in the absence of a magnetic field). Thus, the ions free fall into the wall, as described in Hernqvist, et al., *IEEE Journal of Quan. Elec.*, QE-3, 66 (1967). As shown below, the magnetic field does not greatly aid the confinement in the dc discharge. The power dissipated for the dc discharge case is thus approximately given by:

$$P_{abs}(\text{freefall}) = 2\pi L a V_s n (Q^* + \tfrac{3}{2}(T_e + T_i)) \quad (1)$$

For a length $L=50$ cm; a discharge tube radius $\alpha=0.2$ cm; a sound velocity $v_s=2.19\cdot 10^5$ cm/sec; a density $n=10^{14}$ cm$^{-1}$; an energy expended per ion pair $Q^*=88$ eV, $T_e=2$ eV; and $T_i=0.1$ eV; Eq. (1) shows that there is about 20 KW of power dissipated.

Using a plasma microwave discharge, as described herein, the dominant losses will be the same, except that the radial transport will be governed by Bohm diffusion. See, e.g., Krall and Trievelpiece, *Principles of Plasma Physics*, p. 21, McGraw-Hill, Inc., New York (1973). In such instance, the power dissipated may be approximated by:

$$P_{abs}(\text{Bohm}) = 2\pi L n D_B \left( Q^* + \tfrac{3}{2}(T_e + T_i) \right) \quad (2)$$

where $D_B=(1/16)(cT_e/eB)$, where c is the speed of light, and B is the magnetic field strength.

Dividing Eq. (1) by Eq. (2), one obtains an indication of the improvement that results in the electrical efficiency between the dc discharge case (free fall) and the microwave discharge (Bohm). Such improvement is $$\frac{P_{abs}(\text{freefall})}{P_{abs}(\text{Bohm})} = \frac{AV_S}{D_B} = 248 \frac{B a}{T_e^{\frac{1}{2}}} \quad (3)$$

Thus, if $B=0.5$ tesla, $\alpha=0.2$ cm, and $T_e=2.0$ eV, the improvement (obtained from Eq. (3)) is a factor of 17.5. With the magnetic field B lowered to $B=0.16$ tesla, the improvement is 5.6, which still represents a significant improvement. Such improvements assume that the electron temperatures are the same in the two types of discharge. The assertion that the radial transport is due to Bohm diffusion is actually a pessimistic assumption. If one assumes that the radial transport is due to the classical ambipolar diffusion, see Krall and Trievelpiece, cited above, across the magnetic field, rather than Bohm diffusion, then the improvement is about a factor of 80. Such improvement results because the low pressure in the discharge tube, which is on the order to 5–50 mTorr, significantly reduces the ion-neutral collision frequency, which in turn reduces the radial diffusion.

It is desirable that the radius of the discharge tube 16 not be too small, else the plasma will be concentrated at the power maxima of the cavity. Thus, assuming that an axially uniform discharge is desirable, a minimum discharge tube radius $\alpha$ can be determined. The radial loss time, $t_r$, may be expressed as $$t_r = \frac{a^2}{D_B} \quad (4)$$

It is preferred that the axial distance that an ion pair travels in a radial loss time be greater than a quarter wavelength, or that $v_s t_r > \lambda_0/4$. Hence, $$a^2 > \frac{\lambda_0 D_B}{4 V_S} \quad (5)$$

or (assuming a 2.45 GHz signal)

$$a^2 > 0.0124 \frac{T_e^{\frac{1}{2}}}{B} \quad (6)$$

For $T_e=2.0$ eV and $B=0.5$ tesla, it is thus seen that the discharge tube radius $\alpha$ should be greater than 0.187 cm. Hence, selecting $\alpha=0.2$ cm is a valid choice.

In laboratory experiments, it has been found that about 20% of the lost power is due to ion pair transport, and about 80% is radiation loss. Furthermore, it has been found that an air-cooled fused quartz discharge tube can withstand 19.3 W/cm$^2$. Thus, a 50 cm long air-cooled laser discharge tube of radius $\alpha=0.2$ cm can withstand 1.22 KW. It is thus seen that for a laser that requires 6 KW of magnetron power or less, air cooling should be sufficient. Of course, liquid cooling of the discharge tube can be used, if needed; and liquid cooling may also be used, as required, for a 0.5 tesla magnet.

As indicated above, the primary role of the axial magnetic field in an argon ion dc discharge laser appears to be to enhance the spontaneous emission, and not to primarily provide better radial confinement. Indeed, as also indicated above, when a dc discharge is used, some hydrodynamic instabilities apparently occur, causing the plasma to effectively blow apart, and be spent in the walls of the discharge tube. Thus, using an axial magnetic field for improved radial confinement of the plasma in a dc discharge device does not appear to be a goal that is readily achievable.

The improvement in electron density as a function of a magnetic field in a dc discharge device has been documented in the art. See, Labuda, et al., *IEEE Journal Quan. Elec.*, QE-1, 273 (1965). The electric field is proportional to the electron drift velocity (at constant electron mobility). Hence, a decrease in the electron drift velocity implies an increase in the charge particle density for constant current density. The cited reference of Labuda, et al. shows a slow, modest improvement in density occurs at a low magnetic field, but in the high current density cases, the improvement ceases at a magnetic field of about 600 gauss. This same behavior (albeit for different current densities and gases) is shown in Hoh, et al., *Phys. Fluids*, 3, 600 (1960). The behavior observed by Hoh et al. is explained by Kadomtsev, et.al, "Reviews of Plasma Physics," Vol. 2, p. 158, *Consultants Bureau*, New York (1966), and Kadomtsev and Nedospasov, *J. Nuclear Energy, Part C, Plasma Physics*, Vol. 1, p. 230 (1960), as being due to a helical instability. Hence, it is likely that the behavior observed by Labuda et al. is also due to some hydrodynamic instabilities. Advantageously, no such instabilities are present in a microwave discharge laser of the type described herein.

The radial confinement achieved due to the presence of the axial magnetic field in a dc discharge laser appears only to be modest and ceases at relatively low magnetic field values. However, it has been found empirically that the spontaneous emission increases with the magnetic field up to about 0.16 tesla and then it saturates. See Bridges et al., *Proc. IEEE*, 59, 724 (1971). Thus, dc discharge lasers of the prior art use an axial magnetic field, up to a value of about 0.16 tesla, but apparently do so only for the improvements to the spontaneous emission. The radial confinement improvement is slight. In contrast, the primary purpose for the radial magnetic field in the present invention is for radial confinement, i.e., to reduce radial plasma loss, thereby reducing the amount of input power required to maintain the plasma in a desired lasing state. Such confinement also offers the additional advantage, as explained above, of allowing the discharge tube to operate at cooler temperatures, which also improves the overall efficiency of the laser.

As described above, it is thus seen that the present invention provides a gas discharge laser that provides high output power at increased efficiency. More particularly, it is seen that the invention provides a highly efficient gas/ion discharge laser that uses resonant microwave energy to create a high density plasma to be used as the lasing medium, maintains the radial plasma loss at a minimum level, and eliminates the use of electrodes and a dc current.

Also, as further seen herein, the invention provides a gas/ion discharge laser wherein the discharge tube may require much less external cooling, thereby further improving the efficiency of the laser and increasing its operating life.

As a result of the efficiencies obtained with a laser made in accordance with the present invention, which efficiencies reduce the cooling requirements and thermal cycling of the discharge tube, it is further seen that the invention provides a gas/ion laser having a longer operating life.

As a result of not using a dc current, it is also seen that the invention provides a gas discharge laser that does not require the use of gas return systems to redistribute the neutral gas particles within the discharge tube.

While the invention herein disclosed has been described by means of specific embodiments and applications thereof, numerous modifications and variations could be made thereto by those skilled in the art without departing from the scope of the invention set forth in the claims.

What is claimed is:

1. A gas discharge laser comprising:
   a cylindrical symmetric cavity having a longitudinal axis and a high unloaded Q;
   means for establishing resonant microwave energy within said cavity, thereby forming a resonant microwave cavity;
   a discharge tube inside of said cavity and coaxial with said longitudinal axis, said discharge tube having a prescribed gas therein maintained at a pressure that is less than about 100 mTorr;
   means for establishing an axial magnetic field having a prescribed intensity within said discharge tube, said axial magnetic field being characterized by magnetic field lines that are substantially parallel to said longitudinal axis along the length of said discharge tube;
   first and second mirrors located adjacent first and second ends of said discharge tube, respectively, said first and second mirrors being optically aligned with said longitudinal axis such that light reflects between said mirrors through said discharge tube, said first mirror being totally reflective, and said second mirror being partially transmissive;
   optical interface means for optimizing the transmission of light that reflects between said first and second mirrors through said discharge tube;
   said resonant microwave energy being coupled into said discharge tube along the entire length of the resonant microwave cavity so as to ionize said prescribed gas and produce a plasma column therein, said ionization causing light emissions to occur that reflect between said first and second mirrors, said reflected light being amplified as it passes through said plasma column by additional light emissions, thereby producing the laser.

2. The gas discharge laser as set forth in claim 1 wherein said resonant microwave cavity includes means for tuning said cavity so that a desired frequency resonates therein.

3. The gas discharge laser as set forth in claim 2 wherein said means for tuning comprises means for physically altering the size of said cavity.

4. The gas discharge laser as set forth in claim 3 wherein said means for physically altering the size of said cavity comprises an adjustable plunger at one end of said cavity.

5. The gas discharge laser as set forth in claim 1 wherein said gas discharge laser comprises a metal vapor laser, and wherein said prescribed gas includes metal ions and noble gases.

6. The gas discharge laser as set forth in claim 5 wherein said prescribed gas comprises HeCd.

7. The gas discharge laser as set forth in claim 1 wherein said gas discharge laser comprises a noble gas ion laser, and wherein said prescribed gas includes ions derived from Ne, He, Xe, Kr or Ar.

8. The gas discharge laser as set forth in claim 1 wherein said prescribed gas comprises argon.

9. The gas discharge laser as set forth in claim 8 wherein said prescribed gas includes an argon ion ($Ar^+$).

10. The gas discharge laser as set forth in claim 1 wherein said optical interface means comprises a pair of Brewster windows aligned with said longitudinal axis, a first Brewster window of said pair of Brewster windows being positioned at a first end of said discharge tube, and a second Brewster window of said pair of Brewster windows being positioned at a second end of said discharge tube.

11. The gas discharge laser as set forth in Claim 1 wherein said optical interface means comprises a pair of flat windows coated with an antireflective coating, a first flat window of said pair of flat windows being aligned with said longitudinal axis and positioned at a first end of said discharge tube, and a second flat window of said pair of flat windows being positioned at a second end of said discharge tube.

12. The gas discharge laser as set forth in claim 1 wherein said cylindrical symmetric cavity comprises a plurality of cylindrical symmetric cavities positioned end-to-end along said longitudinal axis such that said discharge tube passes concentrically through each of said cavities, and wherein said means for establishing resonant microwave energy within said cavity includes means for establishing resonant microwave energy within each of said plurality of cylindrical symmetric cavities.

13. The gas discharge laser as set forth in claim 1 further including a conductive screen wrapped around said discharge tube, said conductive screen aiding the initiation of plasma within said discharge tube.

14. Apparatus for exciting a gas to produce a laser comprising:
- a substantially cylindrical symmetric closed plasma chamber having a longitudinal axis, said plasma chamber having a prescribed gas confined therein, said plasma chamber having a diameter of between approximately 0.1 and 2.0 cm, and a length of between approximately 10 to 200 cm;
- magnetic field generating means for generating an axial magnetic field with an associated electron cyclotron frequency $\omega_{cc}$ and magnetic field lines that axially traverse said plasma chamber;
- a cylindrical symmetric resonant cavity surrounding said plasma chamber, said resonant cavity including excitation means for exciting resonant electromagnetic energy within said resonant cavity that is radially coupled into said plasma chamber, said resonant cavity including means for tuning said cavity so that a desired frequency resonates therein, said coupled electromagnetic energy exciting a whistler wave having a frequency $\omega$ in said plasma chamber, where $\omega_{cc} > \omega$, said whistler wave ionizing said prescribed gas and exciting constituents of the ionized gas to produce coherent light;
- said closed plasma chamber and the plasma confined therein comprising part of an optical system that allows the coherent light to reflect between two reflective surfaces, one placed at each end of said plasma chamber;
- said axial magnetic field confining the plasma within said plasma chamber so as to decrease the loss rate of the plasma to said plasma chamber.

15. The apparatus as set forth in claim 14 wherein said prescribed gas is a gas selected from the group argon (Ar), neon (Ne), helium (He), xenon (Xe), krypton (Kr), or radon (Rn), and one of the constituents of said prescribed gas when ionized by the whistler wave comprises an ion of the selected gas.

16. The apparatus as set forth in claim 14 wherein said prescribed gas comprises a noble gas combined with a metal ion.

17. The apparatus as set forth in claim 16 wherein said metal ion comprises a cadmium (Cd) ion and said noble gas comprises helium (He).

18. The apparatus as set forth in claim 14 wherein said plasma chamber comprises a discharge tube made from ceramic.

19. The apparatus as set forth in claim 14 wherein said plasma chamber comprises a discharge tube made from fused quartz.

20. The apparatus as set forth in claim 19 wherein said axial magnetic field has an intensity of between 0.050 and 1.0 tesla.

21. The apparatus as set forth in claim 14 further including a conductive screen placed around the outside of said plasma chamber.

22. A method of producing a plasma laser discharge comprising the steps of:
- (a) positioning a narrow discharge tube inside of a wider, high unloaded Q, cylindrical-symmetric, tunable resonant cavity such that a longitudinal axis of the discharge tube is coaxial with a longitudinal axis of the resonant cavity;
- (b) filling the discharge tube with a prescribed gas at a prescribed pressure that is less than about 100 mTorr;
- (c) establishing and maintaining resonant electromagnetic energy of a prescribed mode at microwave frequencies in the resonant cavity by tuning said tunable resonant cavity, the resonant microwave energy being coupled into said discharge tube where it ionizes the gas to form a plasma of sufficient density to initiate a population inversion within the plasma;
- (d) generating an axial magnetic field having magnetic field lines that are substantially parallel with the longitudinal axis of said discharge tube, said axial magnetic field operating to confine said plasma within the center of the discharge tube away from the walls of the discharge tube, thereby forming a plasma column centered within the discharge tube; and
- (e) placing mirrors at each end of said discharge tube so as to be optically aligned with each other, these mirrors serving to reflect and resonate light (photons) that is emitted as high energy states of matter within the plasma, formed by the population inversion, decay to low energy states, and this light, as it reflects through the plasma, serving to excite additional matter in the plasma to the high energy states, thereby causing additional light to be emitted, thereby amplifying the light as it passes through the plasma, thereby producing the plasma laser discharge.

* * * * *